United States Patent
Gukelberger et al.

(10) Patent No.: US 10,584,665 B1
(45) Date of Patent: Mar. 10, 2020

(54) INTERNAL COMBUSTION, DEDICATED EXHAUST GAS RECIRCULATION ENGINE

(71) Applicant: Southwest Research Institute, San Antonio, TX (US)

(72) Inventors: Raphael Gukelberger, Freudenstadt (DE); Garrett L. Anderson, Sequin, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 16/172,236

(22) Filed: Oct. 26, 2018

(51) Int. Cl.
*F02M 26/43* (2016.01)
*F02B 53/02* (2006.01)
*F02M 26/05* (2016.01)
*F02B 53/00* (2006.01)

(52) U.S. Cl.
CPC ............. *F02M 26/43* (2016.02); *F02B 53/02* (2013.01); *F02M 26/05* (2016.02); *F02B 2053/005* (2013.01)

(58) Field of Classification Search
CPC ........ F02M 26/43; F02M 26/05; F02B 53/02; F02B 2053/005
See application file for complete search history.

(56) References Cited

U.S. PATENT DOCUMENTS 3,906,907 A * 9/1975 Canale .................... F02B 47/08
123/217

* cited by examiner

*Primary Examiner* — Hieu T Vo
(74) *Attorney, Agent, or Firm* — Grossman, Tucker, Perreault & Pfleger, PLLC

(57) ABSTRACT

An engine and a method of operating the engine wherein fuel, intake air, and recirculated exhaust gas provides a first mixture, which is inducted into a first combustion cylinder. The first mixture is combusted in the combustion cylinder to generate a first exhaust gas that applies pressure to a piston within the combustion cylinder, reciprocating the piston and rotating a primary crankshaft coupled to the piston. Fuel and intake air, which provides a second mixture, are inducted into a rotary combustion chamber. The second mixture is combusted in the rotary combustion chamber, wherein the combustion generates a recirculated exhaust gas that applies pressure to the rotor and rotates the rotor and a secondary crankshaft coupled to the rotor. The secondary crankshaft is coupled to the primary crankshaft by a gear mechanism. The recirculated exhaust gas is exhausted into an exhaust gas recirculation loop and recirculated.

20 Claims, 6 Drawing Sheets

US 10,584,665 B1

INTERNAL COMBUSTION, DEDICATED EXHAUST GAS RECIRCULATION ENGINE

FIELD

The present disclosure is directed to utilizing a rotary engine as a dedicated source of exhaust gas for exhaust gas recirculation in an engine.

BACKGROUND

Dedicated exhaust gas recirculation engines route the exhaust of a dedicated cylinder(s) back to the air intake where the recirculated exhaust gas is re-introduced into the combustion chambers of the non-dedicated and, optionally, dedicated cylinders. The dedicated exhaust cylinders may operate at a wider range of air to fuel ratios than the remaining cylinders (non-dedicated recirculation cylinders), and fuel to air equivalence ratios, $\phi$, of greater than 1, as the recirculated exhaust gas is not directly exhausted from the engine. Often dedicated exhaust gas cylinders are run rich to produce hydrogen and carbon monoxide, whereas the remaining cylinders are often operated near stoichiometric ratio or lean. The addition of the hydrogen and carbon monoxide from the recirculated exhaust gas enhances flame speed, combustion, and knock tolerance of all of the cylinders. Operating the non-dedicated cylinders at or near a fuel to air equivalence ratio, $\phi$, of 1.0 or less allows nearly stoichiometric exhaust to leave the engine and a three-way catalyst may be used to reduce pollutant emission. While the complexity and control of reciprocating piston engines including one or more dedicated exhaust gas cylinders is relatively low, there is also relatively little flexibility in operation of dedicated exhaust gas recirculation engines.

Exhaust gas recirculation configurations that utilize high-pressure or low-pressure exhaust gas loops and collect exhaust gas from all of the combustion cylinders, generally lead to a steady supply of exhaust gas in the recirculation loop. In a dedicated exhaust gas recirculation system, however, exhaust gas of a dedicated exhaust gas cylinder is generated once an engine cycle. For example, in the case of an inline, four cylinder engine, flow from a dedicated exhaust gas recirculation cylinder is developed only once every four firing events (i.e., every other crankshaft rotation). This creates a recirculated exhaust gas pulse that may reduce combustion stability and generate cylinder-to-cylinder indicated mean effective pressure imbalances because not all of the cylinders induct the same amount of recirculated exhaust gas as they induct the gas at different times relative to the pulse. An exhaust gas recirculation mixer may mitigate some of the effects of the recirculated exhaust gas pulse spatially and temporally through a number of combustion events. However, it is desirable to provide a dedicated exhaust gas recirculation engine that exhibits relatively more uniform recirculated exhaust gas flow unassisted by an exhaust gas recirculation mixer.

SUMMARY

An aspect of the present disclosure relates to a method of operating an engine. The method includes inducting fuel, intake air, and recirculated exhaust gas, which provides a first mixture, into a first combustion cylinder. The first mixture is combusted in the combustion cylinder wherein combustion generates a first exhaust gas that applies pressure to a piston within the combustion cylinder. The piston, which is coupled to a primary crankshaft, is reciprocated and the primary crankshaft is rotated. The first exhaust gas is then exhausted. In addition fuel and intake air, which provides a second mixture, are inducted into a rotary combustion chamber, wherein the rotary combustion chamber is formed by a rotor in a rotor housing. The second mixture is combusted in the rotary combustion chamber, wherein the combustion generates a recirculated exhaust gas that applies pressure to the rotor. The rotor, which is coupled to a secondary crankshaft, is rotated as well as the secondary crankshaft. The secondary crankshaft is coupled to the primary crankshaft by a gear mechanism. The recirculated exhaust gas is exhausted into an exhaust gas recirculation loop and recirculated.

Yet another aspect of the present disclosure relates to a dedicated exhaust gas recirculation engine. The engine includes a combustion cylinder including a reciprocating piston therein coupled to a primary crankshaft. The engine also includes a rotary combustion chamber formed by a rotor in a rotor housing. The rotor coupled to a secondary crankshaft, which is coupled to the primary crankshaft by a gear mechanism. An air intake is coupled to the combustion cylinder and the rotary combustion chamber. In addition, a first fuel injector and a first exhaust are coupled to the combustion cylinder. A second fuel injector is coupled to the rotary combustion chamber. An exhaust gas recirculation loop is also coupled to the rotary combustion chamber and the air intake.

BRIEF DESCRIPTION OF THE DRAWINGS

The above-mentioned and other features of this disclosure and the manner of attaining them will become more apparent with reference to the following description of embodiments herein taking in conjunction with the accompanying drawings, wherein.

DETAILED DESCRIPTION

Figure 1:
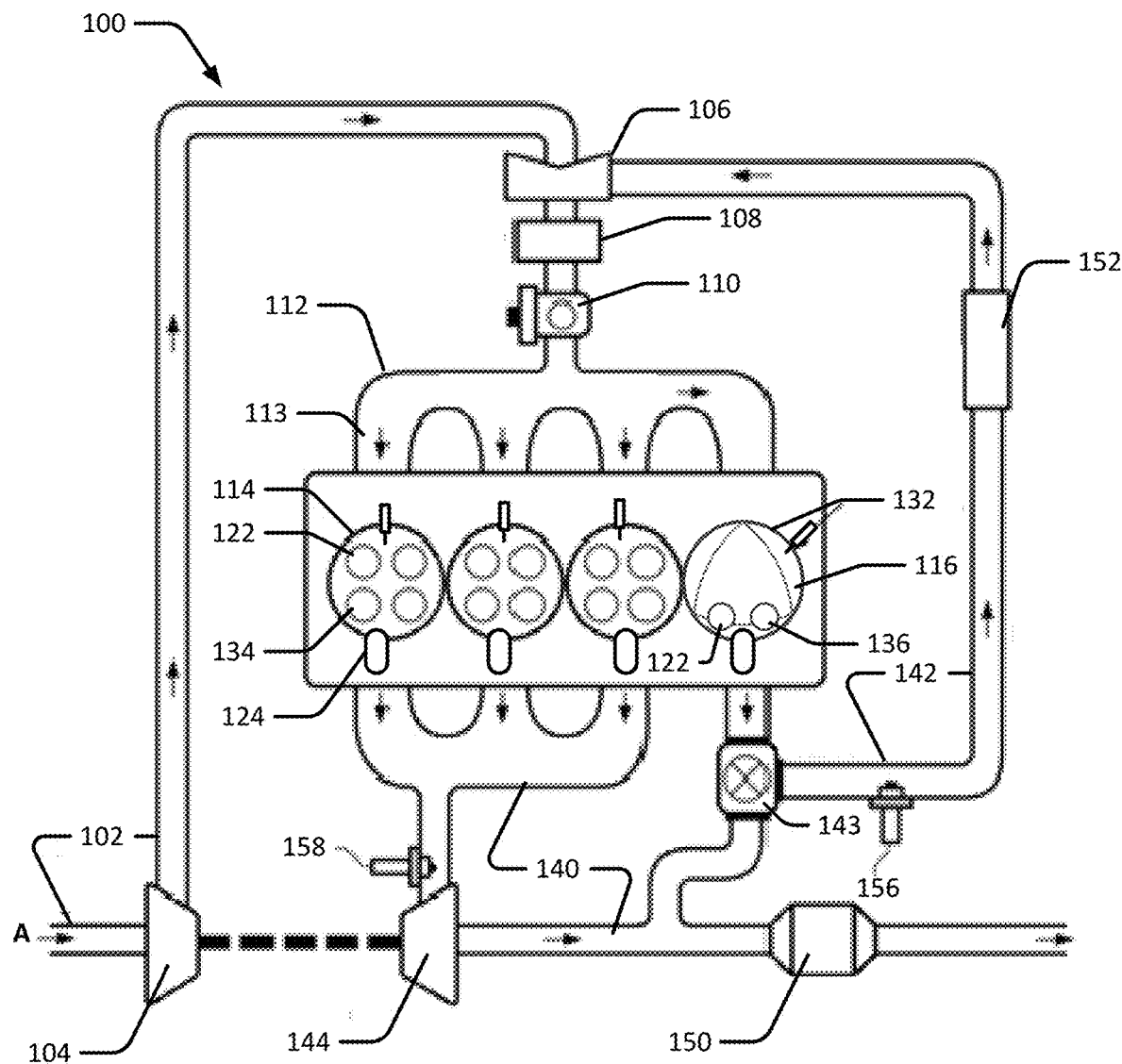
FIG. 1 illustrates an embodiment of engine configuration including a rotary combustion chamber as a dedicated exhaust gas recirculation cylinder.

As noted above, depending on the configuration of the dedicated exhaust gas recirculation engine, the exhaust gas recirculation rate (i.e., the amount of recirculated exhaust gas provided to a given cylinder) may be relatively fixed. For example, the exhaust gas recirculation rate is approximately 25% in a four cylinder, dedicated exhaust gas recirculation engine in which one of the four cylinders is dedicated to providing recirculated exhaust gas to all four cylinders, provided exhaust gas from the dedicated cylinder is not being bled-off. In a split-intake system, where fresh air is provided to the dedicated exhaust recirculation cylinder of a four cylinder engine from one dedicated cylinder and mixed gas (exhaust and fresh air) is provided to the remaining three cylinders, the nominal exhaust gas recirculation rate is approximately 33%. Accordingly, the flexibility in adjusting exhaust gas recirculation rate is relatively low in dedicated exhaust gas recirculation engines.

In a four cylinder engine with one dedicated exhaust gas recirculation cylinder, recirculated exhaust gas is generated once every engine cycle, i.e., two full crankshaft revolutions or four strokes of the piston. As noted above, this results in pulses of exhaust in the exhaust gas recirculation loop. In addition, not all of the cylinders induct air and exhaust combustion gasses at the same time and the beginning of the combustion cycles are staggered. This may, unfortunately, lead to unstable combustion and indicated mean effective pressure imbalances as some cylinders may induct greater amounts of recirculated exhaust gas than others. To more evenly stratify recirculated exhaust gas across the combustion cycles and cylinders, an exhaust gas recirculation mixer is typically employed at the junction of the exhaust gas recirculation loop and the air intake to improve mixing.

The present disclosure is directed to the incorporation of a rotary engine (including a rotary combustion chamber) as a dedicated exhaust gas recirculation source. The rotary engine replaces, or may be used in addition to, the dedicated exhaust gas cylinder typically used in a dedicated exhaust gas recirculation configuration. The use of a rotary engine may improve the distribution of recirculated exhaust gas as compared to a dedicated exhaust gas recirculation configuration that does not incorporate a mixer. Due to the relatively high power produced by a rotary engine, which produces a power stroke every turn of the crankshaft, the overall size and weight of the engine may be reduced. In addition, using a rotary combustion chamber in a rotary engine as the dedicated exhaust gas recirculation chamber reduces the knock, vibration and harshness as the absolute magnitude of torque fluctuations on the crankshaft decrease due to the balance inherent in a rotary engine. It is contemplated that the complexity of the exhaust gas recirculation mixers may be reduced when used in combination with a rotary combustion chamber as the dedicated exhaust recirculation source due to the relatively more even distribution of exhaust gas across multiple combustion cycles.

It is recognized that rotary engines, and particularly Wankel engines, are typically considered to exhibit a number of drawbacks. For example, the elongate shape of a rotary combustion chamber, with a relatively poor surface to volume ratio, may result in relatively high heat loss and reduced efficiency. Yet, the increased heat losses associated with these engines, may lead to cooler exhaust gasses, which in turn reduces the required capacity of exhaust gas recirculation coolers, which may improve dedicated exhaust gas recirculation engine downsizing. In addition, due to earlier flame quenching; increased amounts of $H_2$ and CO may be produced. Upon recirculation, these exhaust gasses improve ignitability, combustion stability, and reduce combustion burn rates and will be re-burned.

Sealing of rotary combustion chambers is also considered a drawback. Rotary engines are relatively difficult to seal due to relatively high stresses placed on the seals, particularly those at the rotor apex, where the rotor may interact with the rotor housing. Seal leakage may result in relatively high friction, increased oil consumption, and contribute negatively to emissions. However, in recirculating and re-burning the exhaust from the rotary engine, leakage due to poor sealing may be negated. In addition, lubricant may be selected that will positively affect combustion, with the understanding that some amount of lubricant will seep into the combustion chamber and be recirculated to the combustion cylinders and rotary engine carried by the recirculated exhaust gas.

Dedicated exhaust gas recirculation loops, herein, may be plumbed in a number of configurations. In general, the dedicated exhaust gas recirculation loop is coupled to an outlet in the housing of a rotary combustion engine and receives exhaust gas from the rotary combustion chambers. The exhaust gas recirculation loop is also coupled to the air intake. The recirculated exhaust gas may be provided to a) just the combustion cylinders or to b) both the rotary combustion chamber and the combustion cylinders. The combustion cylinders and the rotary combustion chamber may be operated at different operating parameters including air to fuel ratio, engine speed, ignition timing, etc. In addition, with the understanding that the sealing of the rotary engine may allow for lubricant to pass into the combustion chamber, different lubricant compositions may be provided to the combustion cylinders and the rotary combustion chamber. The lubricant provided to the rotary combustion chamber may be used to positively affect combustion behavior in the combustion cylinders, as well as in the rotary combustion chamber. For example, the lubricant may improve fuel ignitability, reduce auto-ignition, or mitigate knock.

FIG. 1 illustrates a schematic diagram of an embodiment of engine configuration including a rotary engine to provide a dedicated exhaust gas recirculation combustion chamber. Fresh air "A" is introduced to the engine 100 through an air intake pathway 102, i.e., a primary air intake. The air follows the pathway and is compressed in a compressor 104. The compressor is optional, but preferable, in a number of engine configurations. Downstream of the compressor, the air flows through a mixer 106, which mixes recirculated exhaust gas with fresh intake air. In some embodiments, the mixer may be omitted. The mixed air then passes down the pathway through an intercooler 108 and through the main throttle 110.

From the main throttle 110, the mixed air passes through the intake manifold 112 into the combustion cylinders 114 and the rotary combustion chamber 116 through an air intake manifold runner 113. As illustrated, three of the combustion cylinders 114 include reciprocating pistons. In addition, a rotary engine including a rotary combustion chamber 116 is provided. The rotary combustion chamber is provided by a rotor in a rotor housing in the rotary engine. The rotary engine includes at least one combustion chamber, and usually three combustion chambers. The rotor housing may be formed as a part of the cylinder block as illustrated in FIG. 1 or affixed thereto. While three primary combustion cylinders and one dedicated exhaust gas recirculation rotary combustion chamber are illustrated, it may be appreciated that more than three or less than combustion cylinders may be present and more than one rotary engine, such as two or three rotary engines, may be present.

Fuel may be injected directly into each combustion cylinder 114 and the rotary combustion chamber 116 through fuel injectors 124. The fuel injectors may regulate one or more of the amount, speed, pressure and duration (i.e., pulse width) in which the fuel is introduced into the combustion cylinders and rotary combustion chamber. The fuel injectors may be configured as port fuel injectors, which inject fuel in the runners or ports of the air intake manifold just upstream of the cylinder intake valves, or as direct injections, which inject fuel into the cylinder and combustion chamber. Fuel may also be supplied through fumigation. A combination of two or more of the above fueling strategies (port fuel injection, direct fuel injection and fumigation) may be utilized. For example, fuel may be introduced into the combustion cylinders using port injectors and may be introduced into the rotary combustion chamber through a direct injector. Fuel injection timing may be adjusted and based on a number of factors including air mixture composition, speed and load. In addition, each combustion cylinder and rotary combustion chamber includes a spark plug 132 for igniting the air-fuel mixture in the combustion chamber. Spark timing may also be adjusted and based on a number of factors, described further herein, including air-fuel composition, speed and load.

Exhaust gasses exit the combustion cylinders 114 through exhaust valves 134 into the exhaust manifold 140 and from the rotary combustion chamber 116 through exhaust valve 136 into the exhaust gas recirculation loop 142. Exhaust gas in the exhaust manifold 140 passes through a turbine 144, which drives compressor 104, and then flows through the exhaust treatment system 150, which may include, for example, a three-way catalyst, particulate filter and muffler. The exhaust gas that passes into the exhaust gas recirculation loop 142, is directed through an exhaust gas recirculation cooler 152 and then to the mixer 106 to be mixed with fresh intake air "A". Also included in the exhaust gas loop recirculation loop 142 is a three-way bleed off valve 143, which may direct exhaust gas out of the exhaust gas recirculation loop 142 and into the exhaust manifold 140. In particular embodiments, the three-way valve 143 is optional and may be omitted. In addition, water-gas-shift catalyst and steam reformation catalyst may be employed. The intake and exhaust valves may be opened and closed using a variable valve train and with variable timing. In addition, instead of a boosted engine, as described and illustrated above, a naturally aspirated engine may be provided wherein the compressor, turbine, or both are omitted.

A number of sensors may be provided through the engine. Sensors include oxygen, temperature, pressure, and mass flow sensors, which may be positioned within the air intake, exhaust and exhaust recirculation flow paths. For example, an oxygen sensor 156, such as a universal exhaust gas oxygen sensor (UEGO), is provided in the exhaust gas recirculation loop 142 and another oxygen sensor 158, such as a heated exhaust gas oxygen sensor (HEGO), is provided in the exhaust manifold 140. The sensors are operatively coupled to the various flow paths, i.e., the air intake, the intake manifold, the exhaust manifold, and the exhaust recirculation loop, such that the sensors may detect conditions of the gasses within these flow paths. In embodiments, the sensors are retained in openings in the flow paths such that they contact the gasses within the flow path. In particular embodiments, one or more sensors are inserted into the flow paths that the gasses (air or exhaust) must flow around the sensor.

Figure 2:
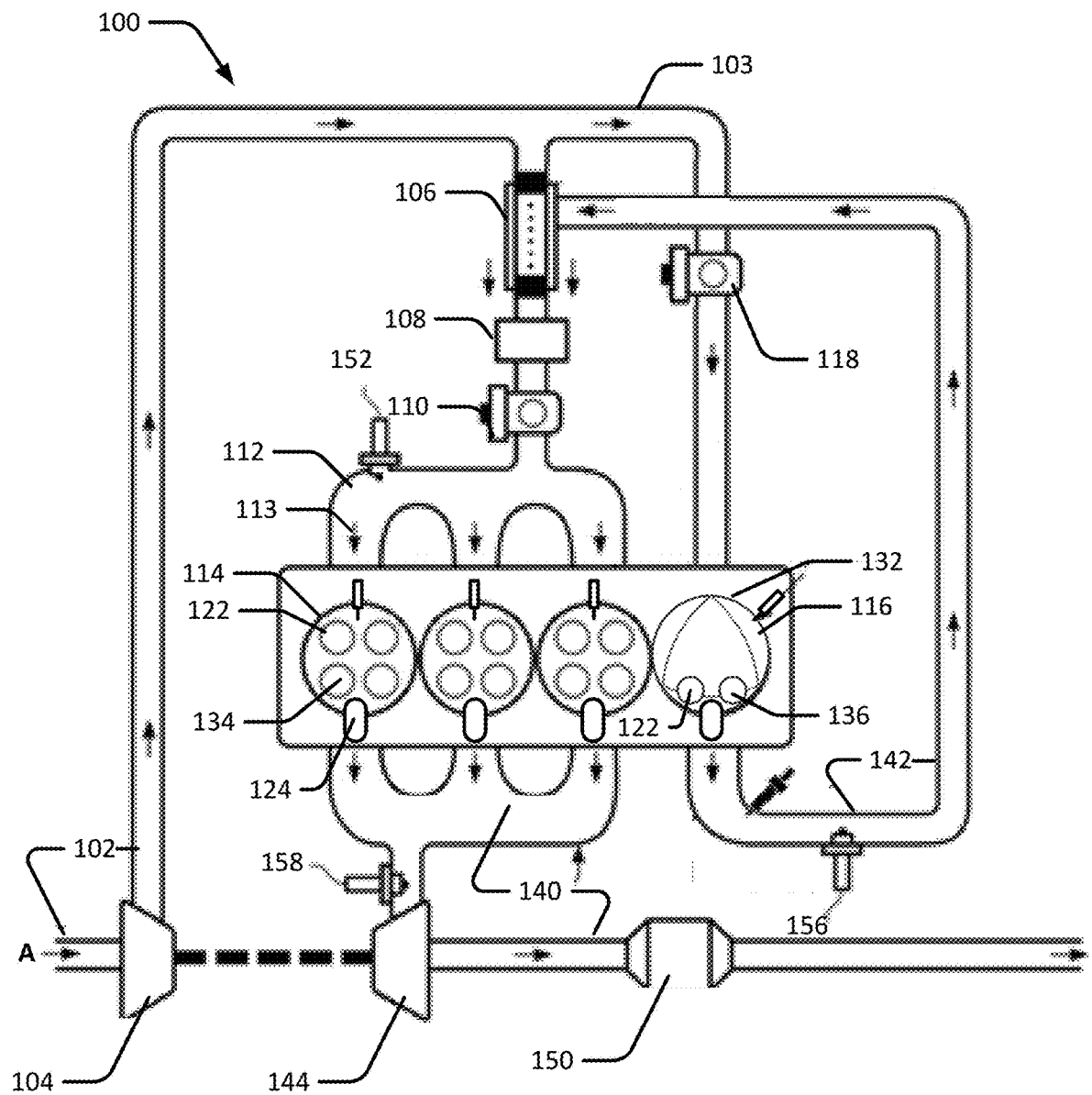
FIG. 2 illustrates another embodiment of an engine configuration including a rotary combustion chamber as a dedicated exhaust gas recirculation cylinder.

FIG. 2 illustrates another embodiment of an engine configuration including a rotary engine providing a dedicated exhaust gas recirculation combustion chamber. Generally speaking, the embodiment of FIG. 2 is similar to that of FIG. 1. In this embodiment, the air intake 102 includes a primary air intake pathway and a secondary air intake 103 coupled to the primary air intake 102. The secondary air intake 103 diverts a portion of the fresh intake air to the rotary combustion chamber 116 in the rotary engine, being coupled to the primary air intake 102 upstream of the exhaust gas recirculation mixer 106. The primary air intake pathway downstream of the exhaust gas recirculation mixer 106 and air intake manifold 112 provide fresh air mixed with recirculated exhaust gas into the combustion cylinders 114 as previously described. A throttle valve 118 may optionally be positioned in the secondary air intake pathway to control air intake into the rotary engine combustion chamber 116. In such an arrangement, the air introduced into the rotary engine combustion chamber 116 is undiluted by the recirculated exhaust gas, i.e., it does not contain any recirculated exhaust gas. This embodiment also illustrates an additional sensor 152, a universal exhaust gas oxygen sensor, placed in the air intake manifold.

It is noted that introducing recirculated exhaust gas into the engine has the effect of lowering combustion temperatures and reducing NOx. On start-up, when it is desirable to heat-up an engine to increase combustion temperatures and activate catalysts in the exhaust treatment system, recirculated exhaust gas may have an undesirable quenching effect on the engine. Similarly, at peak load operating conditions, it may be desirable to reduce the exhaust gas recirculation rate to reduce taxation on the boosting system, increase load potential and enhance spark retard capability. However, bleeding off exhaust gas reduces $H_2$ and CO enrichment provided by the recirculated exhaust gas, which reduces combustion burn rates, improves ignitability and stabilizes combustion.

To address the above, a gearing mechanism is provided herein to operate the combustion cylinders at a different engine speed than the engine speed of the rotary engine. As noted above, for every crankshaft revolution, the rotary engine provides a combustion event, whereas two crankshaft revolutions are required for a combustion cylinder of a four-stroke engine to provide a combustion event. Operating the rotary engine at higher or lower engine speeds (i.e., crankshaft velocities) than the reciprocating pistons allows for alteration of the exhaust gas recirculation rate.

Figure 3:
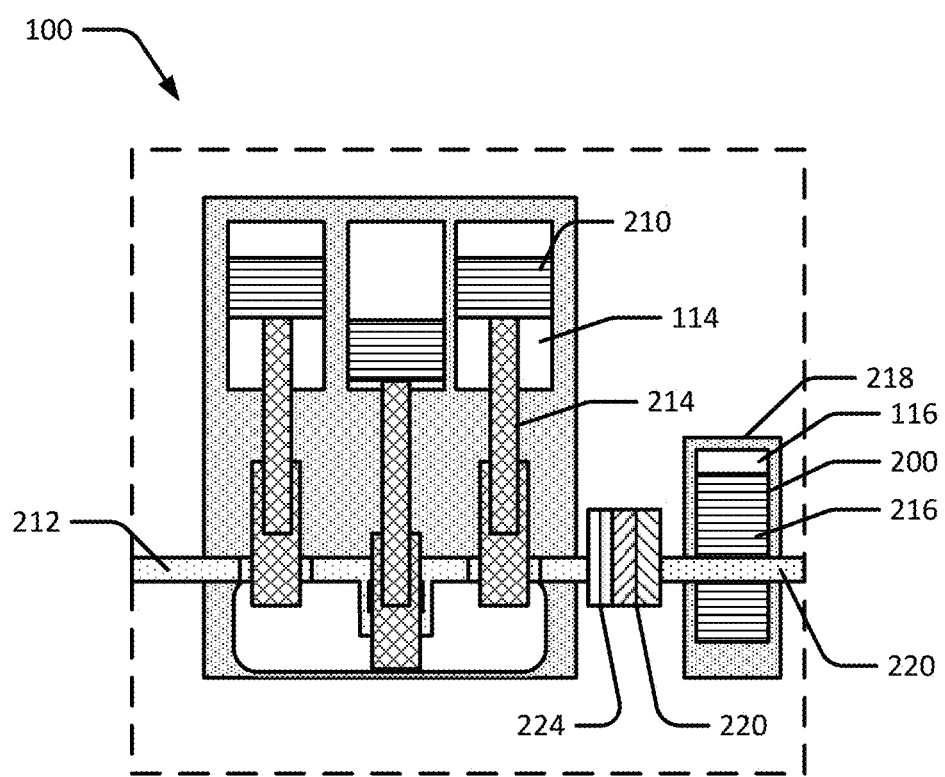
FIG. 3 illustrates a schematic of an embodiment of a primary and secondary crankshaft configuration.

FIG. 3 illustrates a schematic of an embodiment of an engine 100 including a rotary engine providing dedicated exhaust gas recirculation. As illustrated in FIG. 3, the reciprocating pistons 210 are present in the combustion cylinders 114. The reciprocating pistons 210 are coupled to a primary crankshaft 212 by connecting rods 214. The primary crankshaft translates the reciprocating motion of the pistons into rotary motion. The rotary engine 200 includes at least one rotor 216 in the rotary housing 218 and coupled to the primary crankshaft 212. In the illustrated embodiment, the rotary engine 116 rotor 216 is coupled to a secondary crankshaft 220, which is coupled to the primary crankshaft 214 via a gear mechanism 222. The gear mechanism may be provided using a mechanical gear box, planetary transmission or a continuously variable transmission.

The coupling of the primary and secondary crankshafts via a gear mechanism allows for variation in the engine speed of the rotary engine. In particularly preferred embodiments, the engine speed of the rotary engine may be reduced relative to the speed of the primary crankshaft and reciprocating pistons when the engine is operating at stability limited part loads. Further, the engine speed of the rotary engine may be increased relative to the speed of the primary crankshaft at conditions when more recirculated exhaust gas may be or is beneficial, such as at knock limited conditions. Gear ratio changes (i.e., operating the primary and secondary crankshafts at different speeds) may also be used to mitigate cold start issues instead of, or in addition to, using an exhaust gas recirculation bleed-off valve, which is typically a three-way valve that opens at relatively low engine loads, such as at idle conditions or cold starts.

In addition to a gear mechanism, a clutch 224 may also be provided to engage and disengage the secondary crankshaft from the primary crankshaft. The use of the clutch may allow for complete disengagement of the secondary crankshaft from the primary crankshaft and deactivation of the secondary crankshaft. This, in turn, may allow for the complete elimination of the three-way bleed off valve. Of course, adjustments in fuel injection, injection timing, etc. will also be needed.

Figure 4:
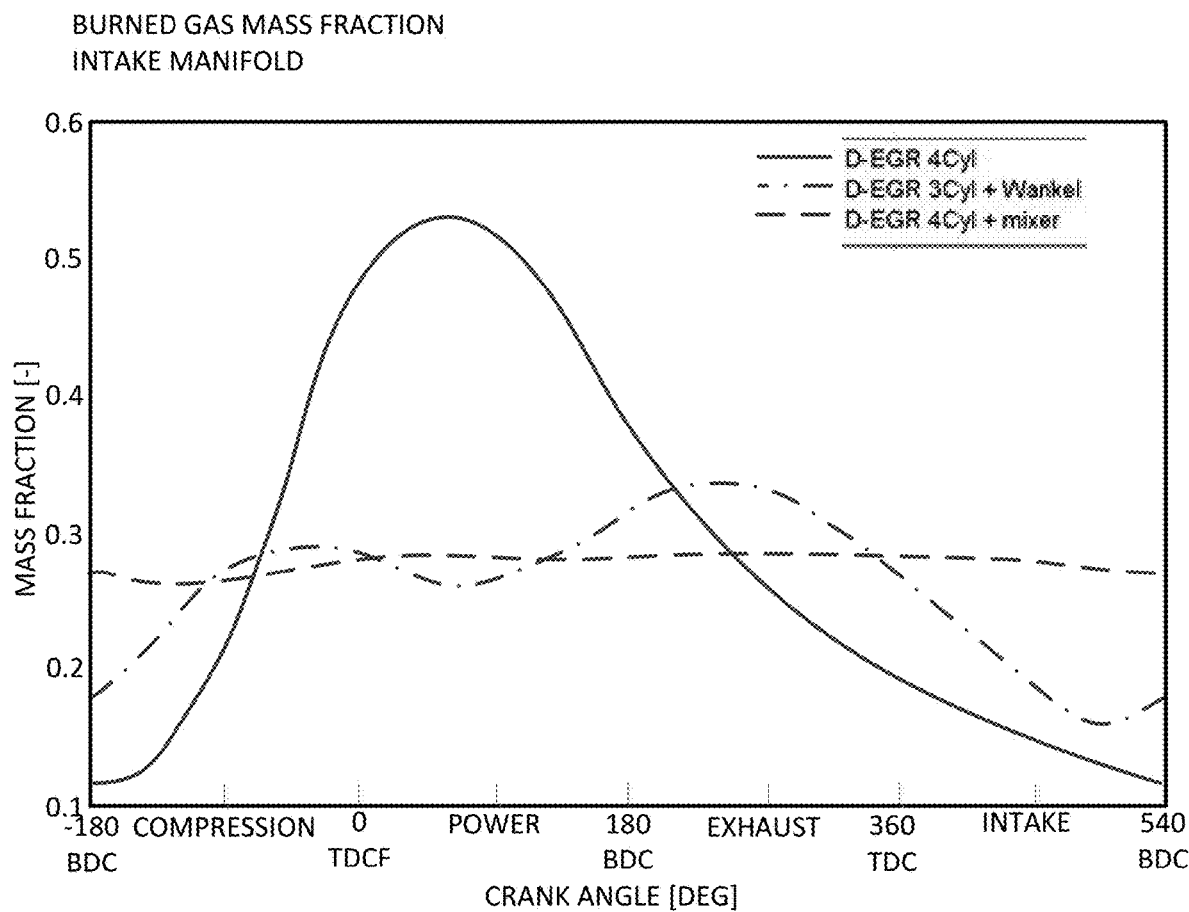
FIG. 4 illustrates a graph of burned mass fraction intake for different exhaust gas recirculation configurations as measured in the intake manifold through the course of a combustion cycle beginning at compression.

Dedicated use of the rotary engine, and its combustion chambers, to provide exhaust gas recirculation improves recirculated exhaust gas distribution across engine cycles and combustion chambers reducing the need for an exhaust gas recirculation mixer. FIG. 4 illustrates a graph of burned mass fraction intake for different exhaust gas recirculation configurations as measured in the intake manifold through the course of a combustion cycle beginning at compression, wherein the engine operates at 2,000 crankshaft rotations per minute (rpm) and at 4.5 bar break mean effective pressure (BMEP). The burned gas mass fraction measured in the intake manifold (kg exhaust/kg air+exhaust) is an indicator of the amount of recirculated exhaust gas. The solid line indicates that a pulse of exhaust gas recirculation gas is created during the engine cycle when using a combustion cylinder as a dedicated exhaust gas recirculation chamber in a four cylinder engine. In this case, the recirculated exhaust gas was introduced into the intake manifold using a pipe "T-insertion". The pulsed nature of the exhaust gas flow and the pulsed nature of the intake at four times the exhaust gas recirculation pulse frequency led to relatively unstable conditions at various operating conditions including steady states of operation.

Figure 5:
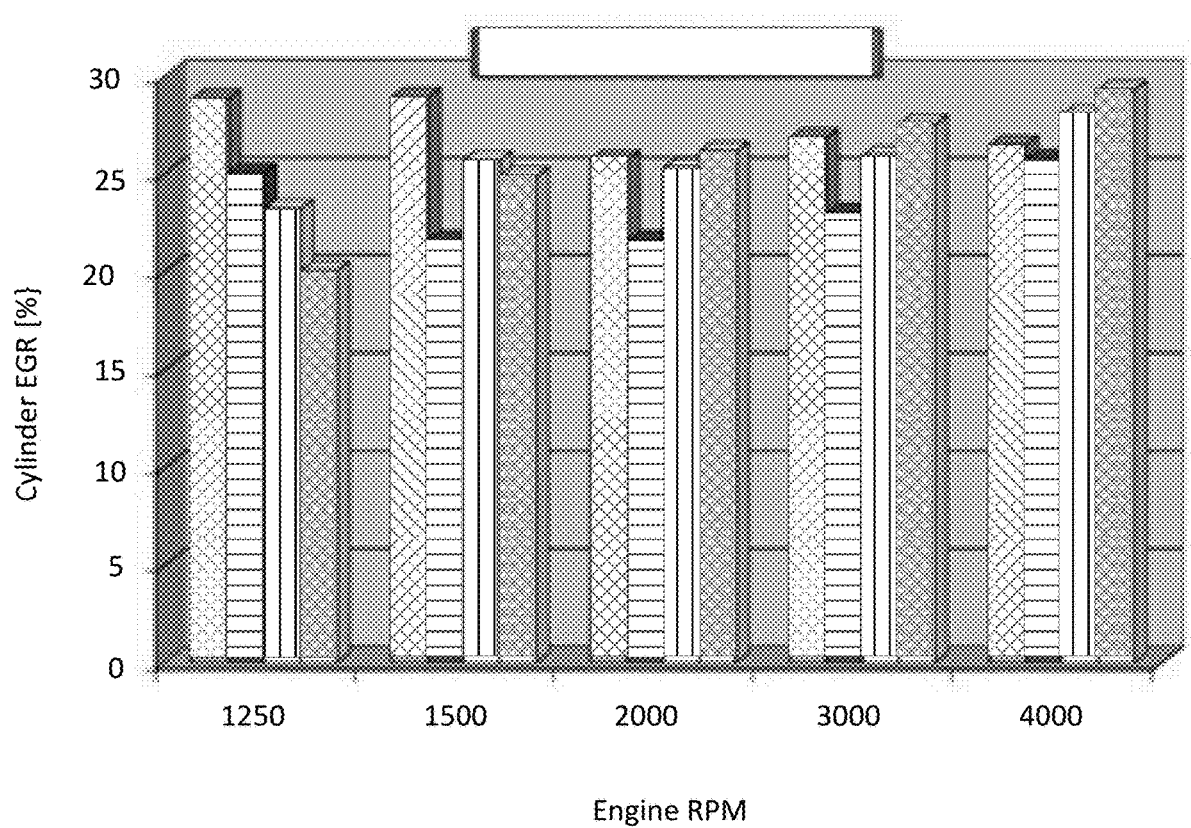
FIG. 5 illustrates a graph of individual cylinder EGR rates for a 4-cylinder dedicated exhaust gas recirculation engine without an exhaust gas recirculation mixer and/or modification to improve distribution.

FIG. 5 illustrates a graph of individual cylinder exhaust gas recirculation rates for a four cylinder dedicated exhaust gas recirculation engine (including a dedicated exhaust recirculation combustion cylinder) without an exhaust gas recirculation mixer and/or modification to improve distribution. At various engine crankshaft rotations per minute (rpm), the cylinder exhaust gas recirculation percentage varied and was found, in some instances, to cause some cylinders to misfire and some to knock. Without being bound to any particular theory, it is believed that the slug, or pulsed, flow of the exhaust gas into the intake resulted in some cylinders ingesting greater recirculated exhaust gas charges than others.

Turning again to FIG. 4, a three cylinder engine with a rotary engine, providing dedicated exhaust gas recirculation and replacing a dedicated exhaust gas recirculation cylinder with a rotary combustion chamber, is represented by the dot-dash line. This engine, without a recirculated exhaust gas mixer, provides relatively steadier output of recirculated exhaust gas in the intake manifold. Overall, the recirculated exhaust mass flow per engine cycle is the same. The displacement of the rotary engine is relatively small and the combustion event occurs once for every crankshaft revolution. This arrangement improves mixing and even allows using a "T-insertion" to couple the exhaust gas recirculation loop to the air intake, and negates the necessity of an exhaust gas recirculation mixer.

The dashed line is a four cylinder engine, where in the four cylinders include one cylinder that is a dedicated exhaust gas combustion cylinder. This arrangement utilized a recirculated exhaust gas mixer to mix the exhaust gas with the fresh intake air over a number of cycles and cylinders. This arrangement provides the steadiest introduction of recirculation exhaust gas into the air intake. However, the mixer adds a level of volume, complexity and weight as well as back pressure, which is desirably reduced or eliminated.

Figure 6:
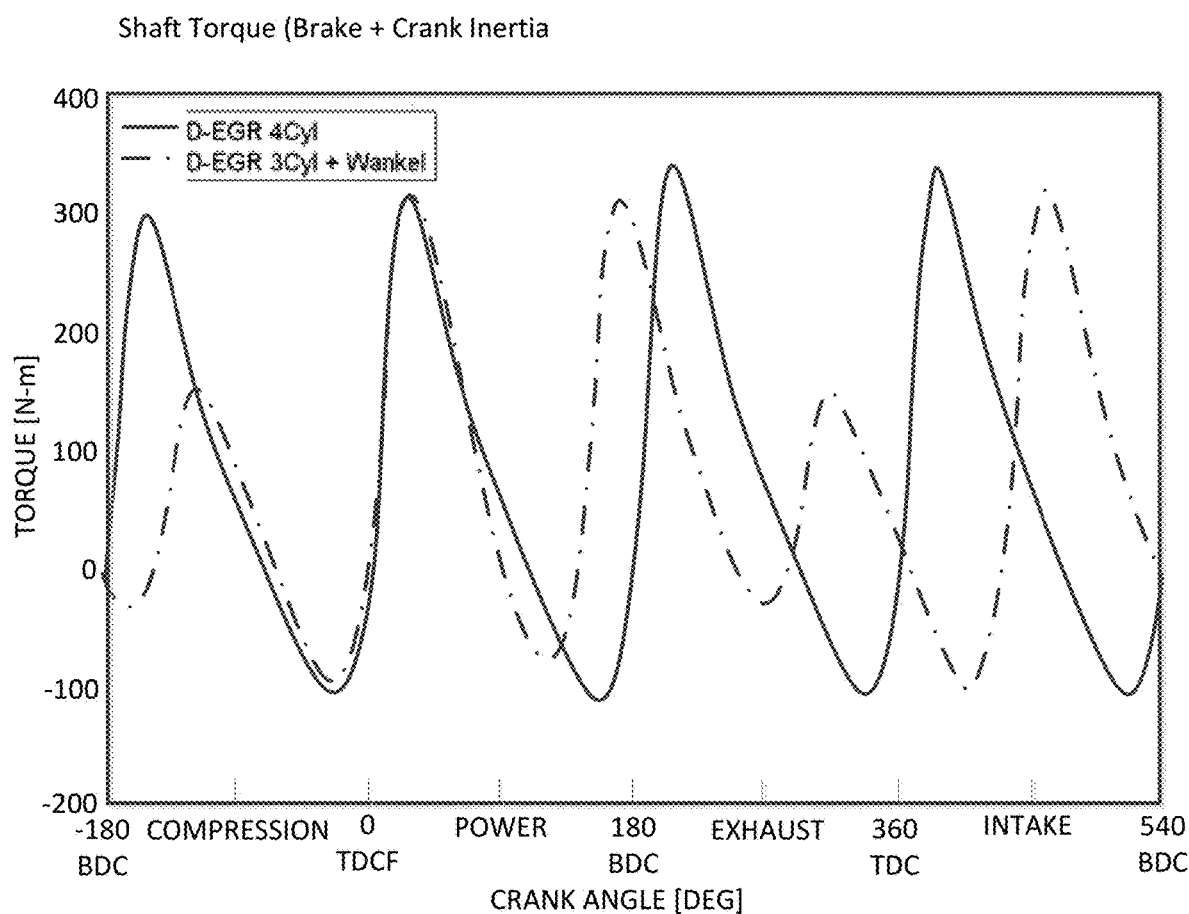
FIG. 6 illustrates a graph of the crankshaft torque for different dedicated exhaust gas recirculation configurations at 2,000 rpm and 4.5 bar break mean effective pressure.

Reciprocation of pistons in a four-stroke engine including, e.g., a four cylinder arrangement, wherein one of the cylinders is a dedicated exhaust gas recirculation cylinder, causes acceleration and deceleration of the crankshaft, which may cause noticeable vibration and may require balancer shafts. FIG. 6 illustrates a graph of the crankshaft torque for different dedicated exhaust gas recirculation configurations at 2,000 rpm and 4.5 bar break mean effective pressure. The solid line illustrates the change in torque on the crankshaft in a four cylinder engine utilizing one combustion cylinder for the purposes of dedicated exhaust gas recirculation. The dot-dashed line illustrates the torque on the crankshaft in a three cylinder arrangement including a rotary engine to provide dedicated exhaust gas recirculation. It has been found that when utilizing rotary engine to provide a dedicated exhaust gas combustion chamber, the absolute magnitude and amplitude of the torque fluctuations on the crankshaft decrease even though the level of torque peaks from individual cylinder firing events.

It may be appreciated that accessory systems that are usually connected to and driven by the primary crankshaft via drive belts, such as the water pump, oil pump, air conditioning compressor, alternators, and power steering pumps, may now be connected to and driven by the secondary crankshaft and operated at variable speeds. For example, at part loads and engine cold-start, increased coolant and oil temperatures may be desirable for improved catalyst light-off, friction reduction and heat transfer reduction. In addition, at part loads (anything that is not at the torque limit of the engine) and engine cold-start (about the first minute of engine operation), the coolant flow may be decreased by variable coolant flow pumps. Further, oil pressure requirements may be lower at part loads. When variable speed pumps and compressors are utilized, the efficiency and emissions can be improved at part loads as the accessory systems do not have to be operated at the speeds designed for rated power conditions. This may be used in combination with a valve overlap strategy if additional recirculated exhaust gas can be tolerated or is desired. At higher engine loads, the secondary crankshaft speeds may be increased to provide greater oil pressure and coolant flow. The inevitable exhaust gas recirculation rate increase will also benefit the knock resistance of the engine at higher loads.

It may further be appreciated that while the above embodiments describe a three cylinder engine including a rotary engine to provide a dedicated exhaust gas combustion chamber, less than three cylinders may be present or greater than 3 cylinders may be present. In addition, in alternative embodiments, more than one rotary engine may be provided for dedicated exhaust gas recirculation.

The present disclosure is also directed to a method of operating an engine including a rotary engine as a dedicated exhaust gas source as described above. The method includes inducting a first air mixture of fuel, intake air, and recirculated exhaust gas from the rotary engine into a combustion cylinder. The first mixture preferably exhibits a fuel to air equivalence ratio near stoichiometric. This mixture is combusted in the combustion cylinder generating first combustion gasses, which apply pressure against a piston in the combustion cylinder and are expelled from the combustion cylinder as first stream of exhaust gas. The first stream of exhaust gas leaves the engine through the exhaust manifold, optionally passes through a turbine, and passes through the exhaust treatment system as described above. The piston is coupled to a primary crankshaft, typically via a connecting rod, which translates reciprocating motion of the piston to rotary motion.

A second mixture of fuel and intake air is inducted into a second combustion chamber provided by a rotary engine. The second mixture may also include recirculated exhaust gas from the rotary engine or, alternatively, exclude the recirculated exhaust gas. The second mixture exhibits a fuel to air equivalence ratio in the range of 1.0 to 1.5. The second mixture is combusted in a second combustion chamber provided by a rotor and rotor housing in a rotary engine, wherein the combustion generates second combustion gasses, which apply pressure against the rotor, and are expelled from the rotary housing as a second stream of exhaust gas. This stream of exhaust gas enters the exhaust gas recirculation loop and is mixed with the intake air in the air intake. In particular embodiments, it is mixed using an exhaust gas recirculation mixer. The rotor is coupled to the primary crankshaft, preferably through a secondary crankshaft that is coupled to the primary crankshaft via a gear mechanism.

As noted above, the primary and secondary crankshafts may rotate at the same speed (i.e., the engine speed). Alternatively, the primary crankshaft rotates at a first speed and the secondary crankshaft rotates at a second speed, wherein the first speed and the second speed are not equal providing different engine speeds of the combustion cylinders and the rotary engine. For example, the engine speed of the rotary engine may be reduced relative to the engine speed of the primary crankshaft and combustion cylinders when the engine is operating at stability limited part loads. In addition, the engine speed of the rotary engine may be increased relative to the speed of the primary crankshaft at conditions when more recirculated exhaust gas may be or is beneficial, such as at knock limited conditions. Further, the secondary crankshaft may be disengaged from the primary crankshaft with a clutch.

It is also noted that accessory systems, such as pumps, compressors, alternators, etc., may be operated from the secondary crankshaft rather than from the primary crankshaft. As the secondary crankshaft speed may be varied, the accessory systems may be operated at variable speeds.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

The invention claimed is:

1. A method of operating an engine, comprising:
   inducting fuel, intake air and recirculated exhaust gas, which provides a first mixture, into a first combustion cylinder;
   combusting said first mixture in said combustion cylinder wherein combustion generates a first exhaust gas that applies pressure to a piston within said combustion cylinder;
   reciprocating said piston, wherein said piston is coupled to a primary crankshaft, and rotating said primary crankshaft;
   exhausting said first exhaust gas;
   inducting fuel and intake air, which provides a second mixture, into a rotary combustion chamber, wherein said rotary combustion chamber is formed by a rotor in a rotor housing;
   combusting said second mixture in said rotary combustion chamber, wherein said combustion generates a recirculated exhaust gas that applies pressure to said rotor;
   rotating said rotor, which is coupled to a secondary crankshaft, and rotating said secondary crankshaft, wherein said secondary crankshaft is coupled to said primary crankshaft by a gear mechanism;
   exhausting said recirculated exhaust gas into an exhaust gas recirculation loop; and
   recirculating said recirculated exhaust gas.

2. The method of claim 1, wherein said primary crankshaft rotates at a first speed and said secondary crankshaft rotates at a second speed, wherein said first speed and said second speed are not equal.

3. The method of claim 2, wherein said secondary crankshaft speed is less than said primary crankshaft speed.

4. The method of claim 2, wherein said secondary crankshaft speed is greater than said primary crankshaft speed.

5. The method of claim 1, further comprising disengaging said secondary crankshaft from said primary crankshaft with a clutch.

6. The method of claim 1, wherein a first lubricant is supplied to said combustion cylinder and a second lubricant is supplied to said rotary combustion chamber.

7. The method of claim 6, wherein said second lubricant inhibits auto-ignition.

8. The method of claim 1, wherein said air introduced to said second combustion chamber does not include said second stream of exhaust gas.

9. The method of claim 1, further comprising mixing said second stream of exhaust gas with intake air in a distribution mixer.

10. The method of claim 1, further comprising driving accessory systems by said secondary crankshaft.

11. The method of claim 10, wherein said accessory systems include at least one of the following: water pump, oil pump, air conditioning compressor, alternator and power steering pump.

12. A dedicated exhaust recirculation engine, comprising:
   a combustion cylinder including a reciprocating piston;
   said reciprocating piston coupled to a primary crankshaft;
   a rotary combustion chamber formed by a rotor in a rotor housing;
   said rotor coupled to a secondary crankshaft, which is coupled to said primary crankshaft by a gear mechanism;
   an air intake coupled to said combustion cylinder and said rotary combustion chamber;
   a first fuel injector coupled to said combustion cylinder;
   an exhaust coupled to said combustion cylinder;
   a second fuel injector coupled to said rotary combustion chamber; and
   an exhaust gas recirculation loop coupled to said rotary combustion chamber and said air intake.

13. The engine of claim 12, further comprising a clutch coupled between said primary crankshaft and said gear mechanism.

14. The engine of claim 12, wherein a first lubricant is supplied to said combustion cylinder and a second lubricant is supplied to said rotary combustion chamber.

15. The engine of claim 14, wherein said second lubricant inhibits auto-ignition of a fuel present in said rotary combustion chamber.

16. The engine of claim 12, wherein said air intake includes a primary air intake coupled to said combustion cylinder and a secondary air intake coupled to said primary air intake and said rotary combustion chamber.

17. The engine of claim 16, wherein said exhaust gas recirculation loop is coupled to said primary air intake down stream of where said secondary air intake is coupled to said primary air intake.

18. The engine of claim 17, wherein said exhaust gas recirculation loop is coupled to said primary air intake with a distribution mixer.

19. The engine of claim 12, further comprising accessory systems coupled to said secondary crankshaft.

20. The engine of claim 19, wherein said accessory systems include at least one of the following: water pump, oil pump, air conditioning compressor, alternator and power steering pump.

\* \* \* \* \*